United States Patent [19]

Fujioka et al.

[11] Patent Number: 4,672,287
[45] Date of Patent: Jun. 9, 1987

[54] INDUCTION MOTOR DIGITAL CONTROL SYSTEM

[75] Inventors: Yoshiki Fujioka, Higashiyamato; Shinichi Kouno, Hino, both of Japan

[73] Assignee: Fanuc Ltd, Minamitsuru, Japan

[21] Appl. No.: 860,197

[22] PCT Filed: Aug. 30, 1985

[86] PCT No.: PCT/JP85/00477

§ 371 Date: Apr. 25, 1986

§ 102(e) Date: Apr. 25, 1986

[87] PCT Pub. No.: WO86/01654

PCT Pub. Date: Mar. 13, 1986

[30] Foreign Application Priority Data

Aug. 30, 1984 [JP] Japan .................................. 59-179267
Aug. 30, 1984 [JP] Japan .................................. 59-179268

[51] Int. Cl.[4] .............................................. H02P 5/40
[52] U.S. Cl. ................................................... 318/800
[58] Field of Search ............................... 318/800-812

[56] References Cited

U.S. PATENT DOCUMENTS

| 4,451,771 | 5/1984 | Nagase et al. | 318/800 |
| 4,456,868 | 6/1984 | Yamamura et al. | 318/800 |
| 4,459,534 | 7/1985 | Nagase et al. | 318/811 |
| 4,543,520 | 9/1985 | Danz et al. | 318/811 |

Primary Examiner—David Smith, Jr.
Attorney, Agent, or Firm—Staas & Halsey

[57] ABSTRACT

An induction motor control system in which the actual velocity of an induction motor follows a commanded velocity by correcting a difference between actual velocity and commanded velocity, and possesses a current negative feedback loop. The system comprises means (9) obtaining excitation current from actual velocity and a torque command of the difference, means (10) obtaining secondary current, which is load current, from the torque command, means (12) obtaining primary current amplitude and current phase based on the excitation current and secondary current, means (11) obtaining slip frequency from actual velocity and torque command, means (13) obtaining an excitation phase from the slip frequency and actual velocity, means (15) obtaining a current command in each phase based on primary current amplitude and current phase, means (16–21) obtaining a voltage command based on current deviation between the current command in each phase and feedback current from the current negative feedback loop, means (29) for correcting the back electromotive force based on excitation current, and means (22–24) superposing the electromotive force, which is for back electromotive force correction based on the excitation current, upon the voltage command. A signal which renders the back electromotive force of the induction motor constant is produced when outputs from means (9) obtaining the excitation current from actual velocity of the induction motor and the torque command of the difference, the means (11) obtaining slip frequency from actual velocity and torque command, and the means (29) generating the electromotive force for back electromotive force correction based on excitation current, are on an upper side of a base velocity.

9 Claims, 9 Drawing Figures $E_1 = k_1 f I_0$

INDUCTION MOTOR DIGITAL CONTROL SYSTEM

DESCRIPTION

1. Technical Field

This invention relates to an induction motor digital control system and, more particularly, to an induction motor digital control system well-suited for application to digital control of an induction motor in which an excitation current serves as a reference.

2. Background Art

Various methods of controlling the velocity of an induction motor are available in the prior art. Typical methods are voltage/frequency (V/F) control, slip frequency control and vector control. Vector control is classified broadly into flux detection-type vector control and slip frequency vector control. There is need of late for quick-response control which, using a microprocessor, takes transient phenomena into account. For this reason, vector control has drawn attention. As opposed to a system which treats voltage and current as scalar quantities having amplitude and frequency, the vector control system controls instantaneous values in each of three phases by treating voltage and current as vector quantities having two components formed by the instantanteous values of three-phase voltage or current. With the vector control system, instability and a limitation upon response ascribable to the scalar treatment are eliminated to make possible control equivalent to that applied to DC motors.

However, the vector control system is such that control is exercised with secondary flux serving as a reference. (Taking the secondary flux along the d axis, the vector control system is based upon a q axis orthogonal to the d axis.) In such a control system, therefore, the secondary flux must be detected, problems are encountered in terms of the response for control, and costs are raised.

An object of the present invention is to provide an induction motor digital control system in which, in order to eliminate the aforementioned difficulties, control is effected in vector fashion on the basis of excitation current, thereby making possible control equivalent to that applied to a DC motor by raising the control response and, at the same time, making possible a reduction in cost.

Another object of the present invention is to provide an induction motor digital control system suitable for digital control using a microcomputer.

Still another object of the present invention is to provide an induction motor digital control system which corrects the back electromotive force of an induction motor and performs precise digital control based on a primary current command.

DISCLOSURE OF THE INVENTION

The present invention provides an induction motor digital control system in which the actual velocity of an induction motor is made to follow up a commanded velocity by correcting a difference between the actual velocity and the commanded velocity, and which possesses a current negative feedback loop. The system comprises means for obtaining an excitation current from the actual velocity of the induction motor and a torque command of the difference, means for obtaining a secondary current, which is a load current, from the torque command of the difference, means for obtaining a primary current amplitude and a current phase based on the excitation current and secondary current, means for obtaining a slip frequency from the actual velocity and torque command, means for obtaining an excitation phase of a rotating field from the slip frequency and actual velocity, means for obtaining a current command in each phase based on the primary current amplitude and current phase, means for obtaining a voltage command based on a current deviation between the current command in each phase and a feedback current from the current negative feedback loop, means for generating an electromotive force for correcting the back electromotive force based on the excitation current, and means for superposing the electromotive force, which is for back electromotive force correction based on the excitation current, upon the voltage command. The means for obtaining the excitation current from the actual velocity of the induction motor and a torque command of the difference, the means for obtaining the secondary current, which is the load current, from the torque command of the difference, the means for obtaining the primary current amplitude and the current phase based on the excitation current and secondary current, the means for obtaining the slip frequency from the actual velocity and torque command, and the means for generating the electromotive force for correcting the back electromotive force based on the excitation current, are constituted by a memory table. A signal which renders the back electromotive force of the induction motor constant is produced as an output when outputs from the means for obtaining the excitation current from the actual velocity of the induction motor and the torque command of the difference, the means for obtaining the slip frequency from the actual velocity and torque command, and the means for generating the electromotive force for back electromotive force correction based on the excitation current, are on an upper side of a base velocity.

According to the present invention, the primary current command in each phase is produced by a primary amplitude and phase outputted by a primary amplitude and phase generator on the basis of an excitation current and secondary current outputted by an excitation current generator and secondary current generator, and a digitalized voltage loop for back electromotive force correction is provided on the inner side of a current loop. Accordingly, the creation of the primary current command is hastened and precise follow-up control in conformance with the primary current command can be executed. In other words, response at the occurrence of transient phenomena is smoothened and control equivalent to that a DC motor can be achieved. In addition, since digitalization of induction motor control is much more advanced, the response of the overall system is improved and less energy is consumed.

BEST MODE FOR CARRYING OUT THE INVENTION

An embodiment of the present invention will now be described with reference to the drawings.

The current of an induction motor is given as a primary current synthesized from secondary current and excitation current.

Figure 2:
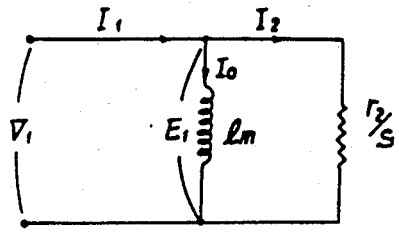
FIG. 2 is an equivalent circuit diagram for one phase of an induction motor.

FIG. 2 is a simplified equivalent circuit diagram for one phase of an induction motor. In FIG. 2, $V_1$ represents terminal voltage, $E_1$ back electromotive force, $I_1$ primary current, $I_o$ excitation current, $I_2$ secondary current, $l_m$ inductance, $r_2$ secondary resistance, and S slip. Accordingly, we have $$E_1 = \omega l_m I_o \quad \ldots (1)$$

$$\frac{r}{S} \times \dot{I}_2 \quad (2)$$

$$\dot{I}_1 = \dot{I}_o + \dot{I}_2 \quad \ldots (3)$$

Figure 3:
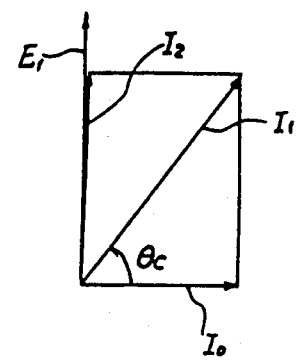
FIG. 3 is a vector diagram based on FIG. 2.

FIG. 3 is the result of expressing the foregoing in terms of vectors. In FIG. 3, $$\theta_c = \tan^{-1} \frac{I_2}{I_o} \quad (4)$$

Output torque can be expressed as follows:

$$T = \frac{2}{\omega} \times E_1^2 \times \frac{S}{r_2} \quad (5)$$

The torque T indicates the torque for one phase.

The inducation motor is controlled in such a manner that the excitation current $I_o$ is rendered constant below a base velocity $N_b$ and back electromotive force is rendered constant above the base velocity.

We therefore obtain the following characteristics with respect to velocity:

(1) Excitation current $I_o$

As evident from FIG. 4, the excitation current $I_o$ is constant below the base velocity $N_b$ and is decreased as velocity N rises above the base velocity $N_b$, in such a manner that the back electromotive force $E_1$ is rendered constant. This may be expressed as follows:

For $N \leq N_b$, $I_o = K$ (constant) .... (6)

For $N \geq N_b$, $I_o = K \times \frac{N_b}{N}$ (7)

(2) Back electromotive force

Figure 4:
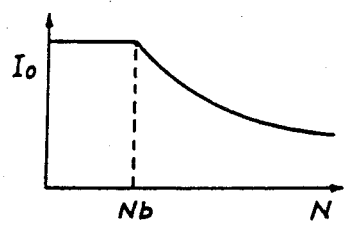
FIG. 4 is a characteristic diagram of velocity versus excitation current.
Figure 5:
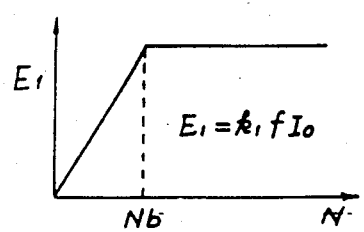
FIG. 5 is a characteristic diagram of velocity versus electromotive force.

As evident from FIG. 5, the back electromotive force $E_1$ is so controlled as to increase up to the base velocity $N_b$ and to be held at a constant value once the base velocity has been attained. To this end, the excitation current $I_o$ is controlled in the manner illustrated in FIG. 4. The back electromotive force is expressed as follows:

$$E_1 = \omega_m I_o \quad \ldots (8)$$

(3) Slip frequency

Figure 6:
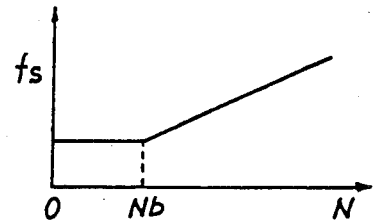
FIG. 6 is a characteristic diagram of velocity versus slip frequency.

As shown in FIG. 6, the slip frequency $f_s$ is constant up to the base velocity $N_b$ and varies in proportion to the output when the velocity is above the base velocity $N_b$. Slip S is expressed as follows:

$$S = I_2 \times r \times \frac{1}{E_1} \quad (9)$$

(4) Torque

Figure 7:
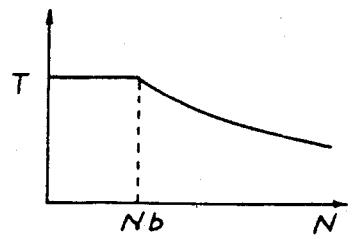
FIG. 7 is a characteristic diagram of velocity versus torque.

As shown in FIG. 7, torque is constant up to the base velocity $N_b$ and decreases when the velocity is above the base velocity $N_b$.

The induction motor digital control system of the present invention will now be described.

Figure 1:
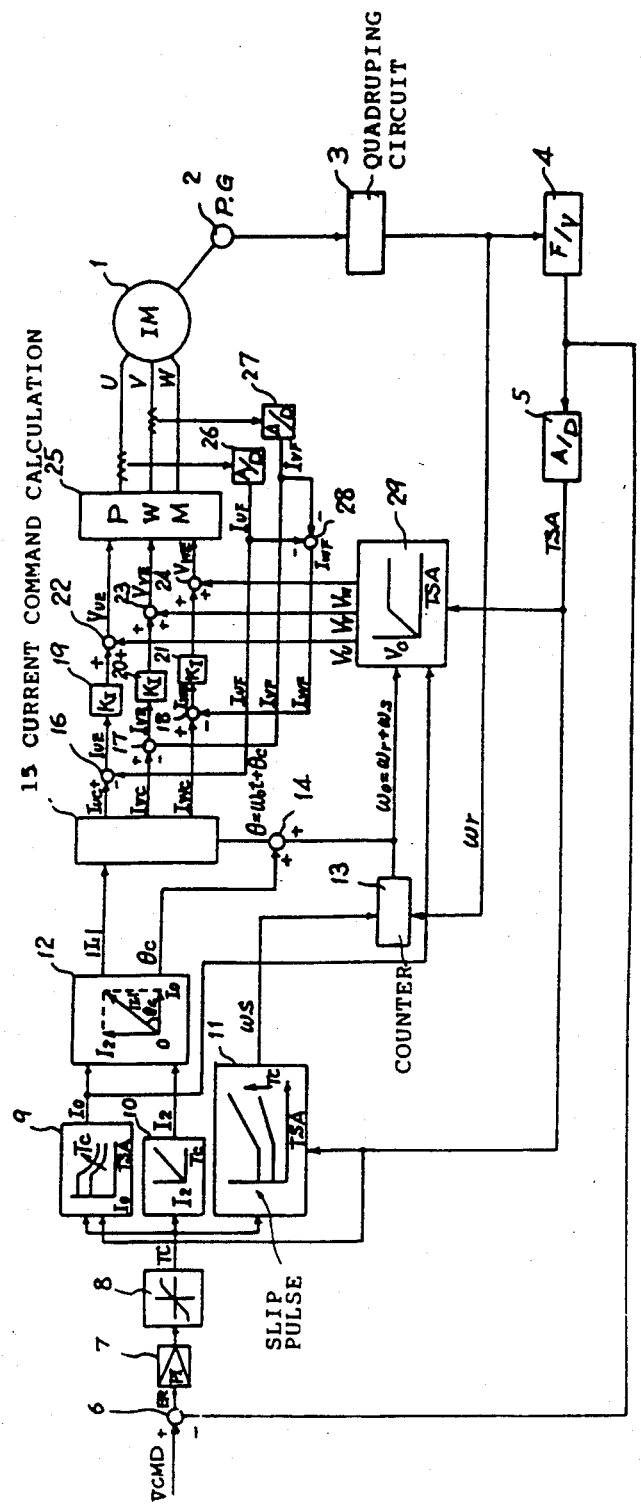
FIG. 1 is a block diagram showing the digital control system of an induction motor according to the present invention.

FIG. 1 is a view showing the overall construction of the control system. In the FIGURE, numeral 1 denotes a three-phase induction motor, 2 a pulse generator, 3 a quadrupling circuit, 4a frequency/voltage converter, 5 an analog/digital converter, 6 an arithmetic circuit, 7 a proportional integrating circuit, 8 a clamping circuit, 9 an excitation current generator, 10 a secondary current generator, 11 a slip frequency generator, 12 a primary current amplitude and phase generator, 13 a counter, 14 an arithmetic circuit, 15 a current command arithmetic unit for each phase, 16 through 18 arithmetic circuits, 19 through 21 blocks having a gain K, 22 through 24 arithmetic circuits, 25 a pulse-width modulating (PWM) circuit, 26 and 27 analog/digital converters, 28 an arithmetic circuit, and 29 a corrective electromotive force generator.

The present invention is characterized in that (I) a primary current command in each phase is created by digital processing, and (II) a voltage loop for back electromotive force correction is formed on the inner side of a current loop and is achieved by digital processing.

A technique for creating the primary current command by digital processing in item (I) will now be described.

1 First, as for the excitation current $I_o$, in the excitation current generating unit 9 the characteristic shown in FIG. 4 corresponding to the velocity N is prepared as a table in memory, the velocity N serves as a memory address, and the excitation current is read out of the memory as data.

2 The secondary current $I_2$ is obtained in the secondary current generator 10 as a value (obtained by multiplication of a coefficient) proportional to a required output.

3 The slip frequency is obtained in the slip frequency generator 11 as a value proportional to the output. In actuality, the slip frequency is obtained by frequency dividing constant clock pulses.

Figure 8:
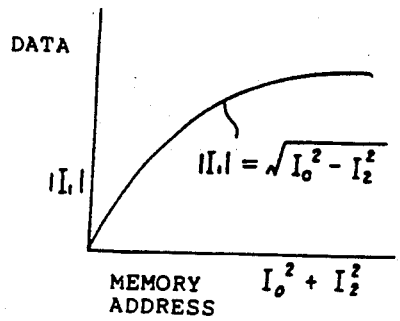
FIG. 8 is a view for describing a table memory of primary current amplitude.

4 As for the amplitude $|I_1|$ of the primary current, the result of performing the calculation $I_o^2 + I_2^2$ is used as a memory address to obtain the value of the square root as data, this being based on the equation $$|I_1| = \sqrt{I_o^2 + I_2^2}$$

evaluated in the primary current amplitude and phase angle generator 12. Thus, as shown in FIG. 8, a primary current command amplitude $|I_1|$ is obtained.

5 The phase $\theta_c$ of the primary current is obtained from $$\theta_c = \tan^{-1}\frac{I_2}{I_o}$$

Figure 9:
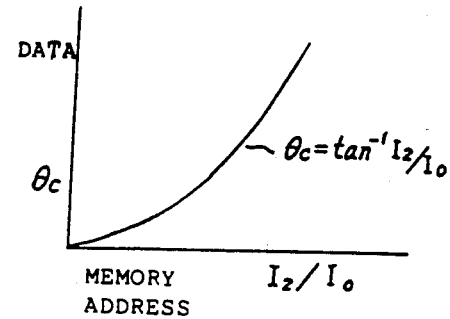
FIG. 9 is view for describing a table memory of phase $\theta_c$.

Specifically, the result of calculating $I_2 I_o$ is used as a memory address to obtain $\tan^{-1} I_1/I_o$ as data. Thus, the phase $\theta_c$ is obtained as shown in FIG. 9.

Meanwhile, slip $\omega_s$ outputted by the slip frequency generator 11 and velocity pulses $\omega_r$ outputted by the quadrupling circuit 3 are counted by the counter 13 to obtain an excitation frequency $\omega_o$ of the revolving field. The excitation frequency $\omega_o$ of the revolving field and the phase $\omega_c$ of the primary current are added by the arithmetic circuit 14, which outputs the phase $\theta = \omega_o t + \theta_c$.

In the current command arithmetic unit 15 for each phase, the following primary current commands for the respective phases are obtained based on the primary current command $|I_1|$ and phase $\theta = \omega_o t + \theta_c$:

$$I_{UC} = |I_1| \times \sin(\theta_o + \theta_c)$$
$$I_{VC} = |I_1| \times \sin(\theta_o + \theta_c \pm 2\pi/3) \quad \ldots (10)$$
$$I_{WC} = |I_1| \times \sin(\theta_o + \theta_c \pm 4\pi/3)$$

It should be noted that a table memory of the sine wave (sin) is provided.

Such an arrangement makes it possible to digitally process the primary current command.

Next, a technique for the back electromotive force correction of item (II) will be described.

One phase will be considered herein. Though obvious from the description of FIG. 5, the back electromotive force $|E_1|$ can be obtained in the form $$|E_1| = K_o \times N$$

when the velocity N is greater than the base velocity Nb, and in the form $$|E_1| = K_1$$

when the velocity N is less than the base velocity Nb.

In the above, $K_o$, $K_1$ are coefficients. Further, the primary current command in each phase conforms to Eq. (10).

Current deviations between these primary current commands and feedback currents from the current loops are applied to respective blocks (19–21) of gain $K_I$ to obtain voltage commands applied to the pulse-width modulating (PWM) circuit 25, and electromotive forces for back electromotive force correction are superposed on the voltage commands. Specifically, the voltage values resulting from this superposition are as follows:

$$V_{UE} = E_U + K_I \times (I_{UC} - I_{UF})$$

$$V_{VE} = E_V + K_I \times (I_{VC} - I_{VF})$$

$$V_{WE} = E_V + K_I \times (I_{WC} - I_{WF})$$ where $I_{UF}$, $I_{VF}$, $I_{WF}$ are actual currents and $K_I$ represents a coefficient.

Further, the back electromotive force corrective voltages in the above equations are as follows:

$$E = |E_1| \times \sin(\theta_o + \pi/2)$$

$$E = |E_1| \times \sin(\theta_o \pm \pi/2 + 2\pi/3)$$

$$E = |E_1| \times \sin(\theta_o \pm \pi/2 + 4\pi 3)$$

These voltages are generated by the electromotive force generator 29. More specifically, actual velocity TSA outputted by the analog-digital converter 5, excitation current $I_o$ and the excitation phase $\omega_o$ of the revolving field are applied to the electromotive force generator 29, in which there is provided a table memory for producing a sine wave. Thus, the electromotive force for back electromotive force correction is capable of being generated by digital processing. The corrective voltage rises in proportion to the rotational velocity up to the base velocity and is constant from the base velocity onward, irrespective of the rotational velocity.

Though the present invention has been described based on the illustrated embodiment, the invention is not limited to this embodiment but can be modified in various ways in accordance with the gist of the present invention, such modifications being within the scope of the invention.

INDUSTRIAL APPLICABILITY

The induction motor digital control system according to the present invention features smooth operation and makes possible precise follow-up control in conformance with the primary current command. Accordingly, the system can be applied to motors for robot drive in addition to servomotors and spindle motors for machine tools, and makes it possible to achieve almost complete computerized control of induction motors.

We claim:

1. An induction motor digital control system in which the actual velocity of an induction motor is made to follow up a commanded velocity by correcting a difference between the actual velocity and the commanded velocity, and which possesses a current negative feedback loop, comprising:

means for obtaining an excitation current from the actual velocity of the induction motor and a torque command of the difference;

means for obtaining a secondary current, which is a load current, from said torque command of the difference;

means for obtaining a primary current amplitude and a current phase based on said excitation current and secondary current;

means for obtaining a slip frequency from the actual velocity and torque command;

means for obtaining an excitation phase of a revolving field from the slip frequency and actual velocity;

means for obtaining a current command in each phase based on said primary current amplitude and current phase;

means for obtaining a voltage command based on a current deviation between said current command in each phase and a feedback current from the current negative feedback loop;

means for generating an electromotive force for correcting the back electromotive force based on the excitation current; and means for superposing the electromotive force, which is for back electromotive force correction based on said excitation current, upon said voltage command.

2. An induction motor digital control system according to claim 1, wherein the means for obtaining the excitation current from the actual velocity of the inducation motor and the torque command of said difference obtains an excitation current which is constant below a base velocity and decreases in proportion to Nb/N above the base velocity.

3. An induction motor digital control system according to claim 1, wherein the means for obtaining the excitation current from the actual velocity of the inducation motor and the torque command of said difference comprises memory means from which the excitation current is read out, with the actual velocity and torque command serving as memory addresses.

4. An induction motor digital control system according to claim 1, wherein the means for obtaining the secondary current, which is the load current, from the torque command comprises memory means from which the secondary current is read out, with the torque command serving as a memory address.

5. An induction motor digital control system according to claim 1, wherein the means for obtaining the slip frequency from the actual velocity and torque command outputs a signal which is constant below a base velocity and increases in proportion to an output of the induction motor above the base velocity.

6. An induction motor digital control system according to claim 1, wherein the means for obtaining the slip frequency from the actual velocity and torque command comprises memory means from which the slip frequency is read out, with the actual velocity and torque command serving as memory addresses.

7. An induction motor digital control system according to claim 1, wherein the means for obtaining the primary current amplitude and current phase based on the excitation current and secondary current comprises memory means from which the primary current amplitude and current phase are read out, with the excitation current and secondary current serving as memory addresses.

8. An induction motor digital control system according to claim 1, wherein the means for generating the electromotive force for correcting the back electromotive force comprises electromotive force generating means for generating an electromotive force which is proportional to velocity below a base velocity and constant above the base velocity.

9. An induction motor digital control system according to claim 1, wherein the means for generating the electromotive force for correcting the back electromotive force based on the excitation current comprises memory means from which the electromotive force for correction the back electromotive force is read out based on the excitation phase, excitation current and actual velocity.

* * * * *

UNITED STATES PATENT AND TRADEMARK OFFICE
CERTIFICATE OF CORRECTION

PATENT NO. : 4,672,287
DATED : June 9, 1987
INVENTOR(S) : YOSHIKI FUJIOKA and SHINICHI KOUNO It is certified that error appears in the above-identified patent and that said Letters Patent is hereby corrected as shown below:

Col. 3, line 7, "is" should be --is a--;
line 22, "$1_m$" should be --$\ell_m$--;

Col 3, line 24, Example 1, "$E_1 = wl_m I_o$" should be $E_1 = jwl_m I_o$ --;

line 31, Example 3, "$I_1^\bullet = I_o^\bullet + I_2^\bullet$" should be $\dot{I}_1 = \dot{I}_o + \dot{I}_2$--;

line 46, "$N_b$" should be --Nb--.

Col. 4, line 4, Example 8, "$w_m I_o$" should be --$wl_m I_o$--;

line 26, "4a" should be -- 4 a--.

Col. 5, line 14, "$I_2 I_o$" should be --$I_2/I_o$--;

line 15, "$^{31}I_1/I_o$" should be --$^{-1}I_1/I_o$--;

line 22, "$w_c$" should be --$\theta_c$--.

Signed and Sealed this

Twenty-ninth Day of December, 1987

*Attest:*

DONALD J. QUIGG

*Attesting Officer*    *Commissioner of Patents and Trademarks*